B. E. RICHARDSON.
LOCK FOR MOTOR VEHICLES.
APPLICATION FILED JULY 24, 1917.
1,321,147.
Patented Nov. 11, 1919.
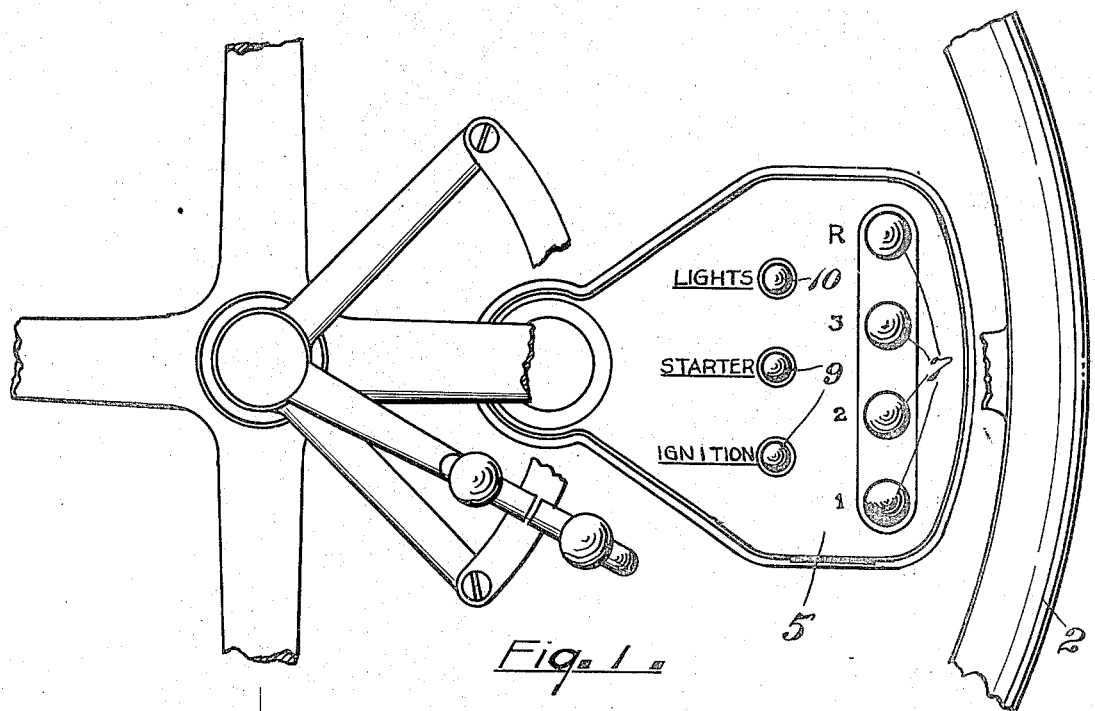
Fig. 1.
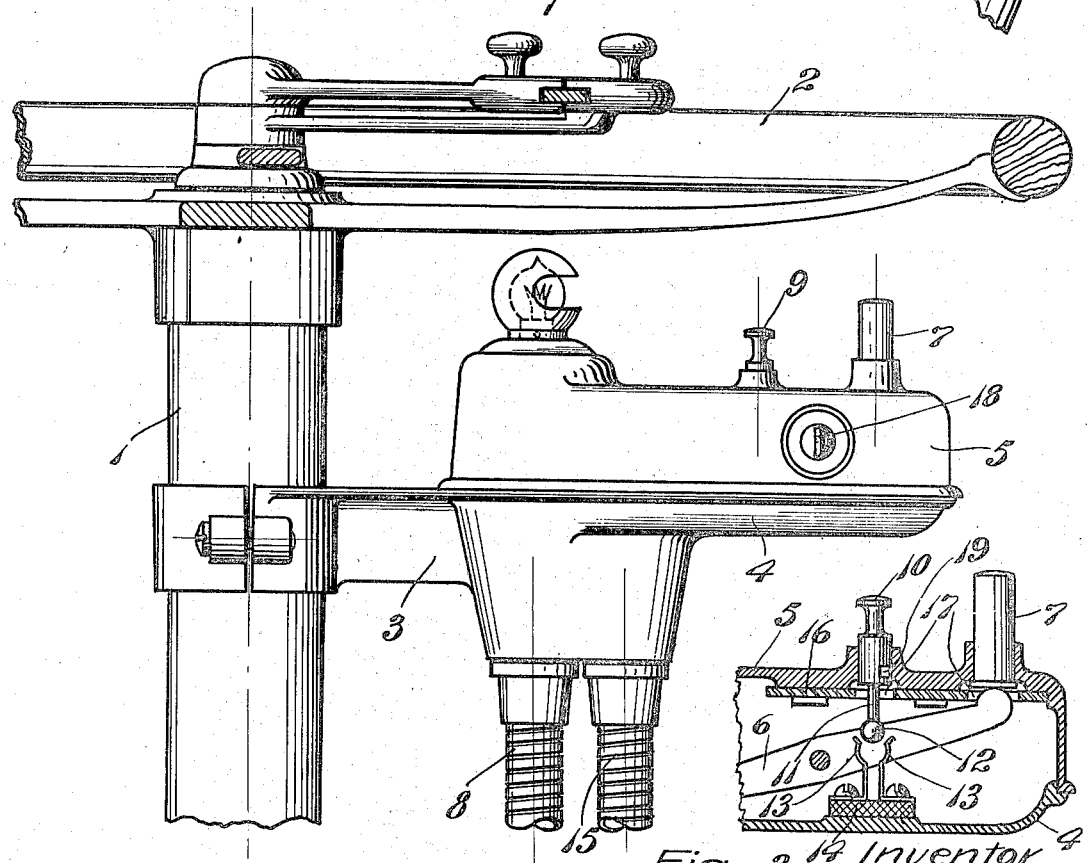
Fig. 2.
Fig. 3.
Inventor
Bayard E. Richardson
By Moulton & Lurance
Attorneys.

UNITED STATES PATENT OFFICE.

BAYARD E. RICHARDSON, OF GRAND RAPIDS, MICHIGAN, ASSIGNOR TO MECHANO GEAR SHIFT COMPANY, OF GRAND RAPIDS, MICHIGAN, A CORPORATION OF MICHIGAN.

LOCK FOR MOTOR-VEHICLES.

1,321,147.  Specification of Letters Patent.  Patented Nov. 11, 1919.

Application filed July 24, 1917. Serial No. 182,443.

*To all whom it may concern:*

Be it known that I, BAYARD E. RICHARDSON, a citizen of the United States of America, residing at Grand Rapids, in the county of Kent and State of Michigan, have invented certain new and useful Improvements in Locks for Motor-Vehicles; and I do hereby declare the following to be a full, clear, and exact description of the invention, such as will enable others skilled in the art to which it appertains to make and use the same.

This invention relates to a locking mechanism for motor vehicles by means of which the starter, the ignition, the lighting system, and the selector mechanism for a gear shift mechanism as disclosed in my former application for patent Ser. No. 182,442 filed July 24, 1917, may all be locked against operation by a single means; or, if desired, the lighting switch may be placed in operative position and locked therein so that the lights are on while all of the remaining devices enumerated are locked in inoperative position. A further object of the invention consists in a very simple, complete and compact assembly of all the controls for a motor vehicle whereby a single locking device may be utilized to lock all against operation. Various other features of novelty will appear as understanding of the invention is had from the following description reference being had to the accompanying drawing in which;

Figure 1 is a fragmentary plan view with parts broken away showing the application of my invention to a motor vehicle immediately below the steering wheel thereof.

Fig. 2 is a side elevation thereof parts being shown in section and,

Fig. 3 is a fragmentary vertical section enlarged through the rear part of the housing on which the various controls are mounted.

Like reference characters refer to like parts throughout the several views of the drawings.

My invention is adapted for application to the steering post 1 of a motor vehicle immediately below the steering wheel 2 thereof. A bracket 3 is secured to the post integral with and extending to the rear from which is a plate 4 forming the lower member of a housing which is completed by an upper member 5. A series of levers 6 are pivotally mounted between their ends within the housing and at their rear ends come immediately below selector members 7, four being shown in the drawing as indicative of the four speeds at which most motor vehicles with sliding gearing transmissions are driven. A flexible tubular member 8 connects with the housing and it is through this member that selector wires are passed from the housing as shown in my former application for patent, said wires being attached to the front end of the levers 6 and leading to the immediate selector mechanism in the transmission gearing which, as it forms no part of the present invention, is not shown. In front of the selector devices 7 are mounted starter and ignition controls 9 and a light control 10. These devices extend through the top of the housing and each carries a depending rod 11 terminating in a spherical head 12 adapted in its lower position to enter between spring contact members 13 mounted upon an insulating base 14 within the housing and having proper connections with the wires which form the ignition, starter and lighting circuits and which lead through a flexible tube 15 from the housing as shown mounted closely adjacent the tube 8 heretofore described. On depression of either the starter or ignition controls 9 the proper electrical circuit is completed, and on depression of the light control at 10 the circuit is completed and the lights are lighted.

A locking plate 16 is slidably mounted immediately below the top of the housing it having a plurality of openings 17 therein large enough to pass the selector devices 7 and ignition, starter and light controls when the plate is in its rearmost position as shown in Fig. 3. This plate may be moved to the front by any suitable key inserted into the housing through a proper key hole opening as shown at 18. When thus moved forward the plate comes underneath the selector button 7 and underneath the larger cylindrical portions of the ignition, starter and light controls whereby depression of the same is stopped. Of course, it is desirable that at certain times the lights may be on though the remainder of the controls are locked against operation, and to this end a notch 19 is cut in the side of the light control 10 whereby it may be depressed to operative position and the locking plate then operated a portion of the plate entering the notch 19 and holding the lighting control in lower position and locked against return to inoperative position, while all of the remaining controls are held in inoperative positions.

The construction outlined is very simple and effective in operation and all of the controls are in a position for ready access by the driver of the automobile. This construction as stated heretofore, locks all of the controls of the machine by use of a single locking means and one which is especially simple and effective.

I claim:—

1. In combination, a housing having a top member, a plurality of selector buttons extending upwardly through said top member and slidable downwardly therethrough, a plurality of levers pivotally mounted in the housing below the top member against the free ends of which the buttons normally rest, and a locking plate slidably mounted below the top member and provided with a plurality of openings which in one position of the plate receive the rear ends of the levers and through which the buttons may freely pass to actuate said levers, said plate when moved to another position interposing between the buttons and levers and stopping any downward movement of the buttons, substantially as described.

2. In combination, a plurality of selector buttons mounted for vertical sliding movements, levers associated with said buttons to be operated on depression thereof, and a plate slidably mounted between the selector buttons and said levers, said plate having openings into which in one position of the plate the ends of the levers enter and through which the buttons may freely pass to operate the levers, the plate in other positions passing under the lower ends of the buttons and over said ends of the levers and stopping said movement of the buttons, substantially as described.

3. In combination, a housing, having a top member, a plurality of light, starter, ignition and gear shift control buttons slidably mounted in said top member for vertical movements, and a plate slidably mounted under said top member, and provided with a plurality of openings which in one position of the plate register with said buttons so as to permit the free passage thereof through the plate, said plate when moved to another position passing under said buttons so as to interpose against movement of the same, substantially as described.

4. In combination, a mechanism as claimed in claim 3 in which said light control button is slotted in one side to receive an adjacent edge of the plate whereby said light button may be moved to operative position or left in inoperative position and locked against movement in either position with all the remaining buttons held in inoperative position, substantially as described.

In testimony whereof I affix my signature.

BAYARD E. RICHARDSON.